United States Patent [19]

Swanepoel

[11] Patent Number: 5,485,650
[45] Date of Patent: Jan. 23, 1996

[54] WINDSCREEN WIPER WITH ELONGATED, CURVED BACKBONE

[75] Inventor: Adriaan R. Swanepoel, Pretoria, South Africa

[73] Assignee: Adriaan Retief Swanepoel, South Africa

[21] Appl. No.: 137,769

[22] Filed: Oct. 19, 1993

[30] Foreign Application Priority Data

Oct. 23, 1992 [ZA] South Africa ............... 92/8225

[51] Int. Cl.⁶ ...................................... B60S 1/38
[52] U.S. Cl. .................... 15/250.43; 15/250.48; 15/250.361
[58] Field of Search ............... 15/250.20, 250.42, 15/250.36, 250.02, 250.41, 250.40, 250.37, 250.38, 250.39, 250.01; D12/155

[56] References Cited

U.S. PATENT DOCUMENTS

| | | | |
|---|---|---|---|
| 2,589,339 | 3/1952 | Carson | 15/250.36 |
| 3,029,460 | 4/1962 | Hoyler | 15/250.36 |
| 3,104,412 | 9/1963 | Hinder | 15/250.42 |
| 3,192,551 | 7/1965 | Appel | 15/250.36 |
| 3,480,986 | 12/1969 | Forster | 15/250.42 |
| 3,751,754 | 8/1973 | Quinlan | 15/250.42 |
| 3,780,395 | 12/1973 | Quinlan | 15/250.42 |
| 3,872,537 | 3/1975 | Bianchi | 15/250.42 |
| 3,881,214 | 5/1975 | Palu | 15/250.42 |
| 4,028,770 | 6/1977 | Appel | 15/250.42 |
| 4,063,328 | 12/1977 | Arman | 15/250.42 |
| 4,102,003 | 7/1978 | Hancu | 15/250.42 |
| 4,127,916 | 12/1978 | van den Berg et al. | 15/250.42 |
| 4,339,839 | 7/1982 | Knights | 15/250.36 |
| 4,343,063 | 8/1982 | Batt | 15/250.42 |
| 4,587,686 | 5/1986 | Thompson | 15/250.42 |
| 4,807,326 | 2/1989 | Arai | 15/250.42 |

FOREIGN PATENT DOCUMENTS

| | | |
|---|---|---|
| 2515121 | 4/1983 | France . |
| 2311293 | 9/1974 | Germany . |
| 2336271 | 2/1975 | Germany . |
| 2350302 | 4/1975 | Germany . |
| 2353368 | 5/1975 | Germany . |
| 1012902 | 5/1963 | United Kingdom . |
| 1395918 | 5/1975 | United Kingdom . |

Primary Examiner—Gary K. Graham
Attorney, Agent, or Firm—Cushman Darby & Cushman

[57] ABSTRACT

A windscreen wiper includes an elongate curved backbone which is of a resiliently flexible material and which has a connecting formation at a position intermediate its length for connection to a displacing and force applying member. The backbone has a free-form curved profile in a plane, thereby to define a transverse axis perpendicular to the plane. The backbone further has a suitably varying transverse cross-sectional profile along its length such that if it is clamped at its connecting formation and a test force of 1N applied at a tip in a direction that is parallel to the transverse axis, the tip is displaced less than 1.0 mm.

10 Claims, 2 Drawing Sheets

WINDSCREEN WIPER WITH ELONGATED, CURVED BACKBONE

FIELD OF INVENTION

This invention relates to a windscreen wiper and more particularly to an elongate curved backbone for a windscreen wiper which is of a suitably resiliently flexible material.

SUMMARY OF THE INVENTION

According to a first aspect of the invention there is provided a windscreen wiper which includes an elongate curved backbone which is of a resiliently flexible material and which has a connecting formation at a position intermediate its length for connection to a displacing and force applying member;

the backbone having a free-form curved profile in a plane, thereby to define a transverse axis perpendicular to the plane; and the backbone having a suitably varying transverse cross-sectional profile along its length such that if it is clamped at its connecting formation and a test force of 1N applied at a tip in a direction that is parallel to the transverse axis, the tip is displaced less than 1.0 mm.

Preferably, it is displaced less than 0.7 mm. Most preferably, it is displaced less than 0.25 mm.

The tip to which the test force is applied may be displaced a distance $$Z_E < \left( \frac{0.7}{l} \right) 0.625 \quad (1)$$

Preferably, said displacement may be $$Z_E < \left( \frac{0.0763}{l} \right) 0.625$$

where l is the cantilever length of the backbone from the connecting formation to the tip to which the test force is applied and where $Z_E$ is the displacement in mm if l is in meters.

The windscreen wiper may include a wiper blade attached to the backbone. The backbone may be of metal. Further, the backbone may be in the form of a single homogenous strip or in the form of a laminate.

The connecting formation may be centrally located. The backbone may be asymmetrically arranged about the connecting formation. The distance from the connecting formation to each tip may be at least 200 mm.

According to a second aspect of the invention, there is provided a windscreen wiper which includes an elongate backbone which is curved in a plane, is of a resiliently flexible material and which has a connecting formation at a position intermediate its length for connection to a displacing and force applying member;

the backbone defining an x–y plane, a z-axis extending perpendicularly from the x–y plane;

the backbone having a suitably varying cross-sectional profile along its length and a suitable free-form curvature, such that a double integral $Z_T$ is less than 1.0 mm, where $$Z_T = \int_o^l \sin \left[ \int_o^x \frac{I_{zz}(x)}{R(x) I_{yy}(x)} dx \right] dx$$

and $I_{zz}(x)$ is the moment of inertia about the z-axis at a position x along the backbone, R(x) is the radius of curvature of the backbone at position x, and $I_{yy}(x)$ is the moment of inertia about the y-axis at position x.

Preferably $Z_T < 0.5$ mm.

The windscreen wiper may include a wiper blade attached to the backbone.

Persons skilled in the art will appreciate that the backbone will have a concave side and a convex side, the wiper blade being attached to the concave side and the displacing and force applying member on the convex side.

The backbone may be of metal such as spring steel and may be in the form of a single homogenous strip or may be in the form of a laminate.

The connecting formation may be centrally located or the backbone may be asymmetrically arranged about the connecting formation.

The distance from the connecting formation to each tip may be at least 200 mm.

Those skilled in the art will appreciate that $I_{zz}(x)$ and $I_{yy}(x)$ are determined by the transverse dimensions of the backbone at any position along its length. In most cases, the backbone will have a regular cross-sectional profile which may, for example, be rectangular or ellipsoidal. In most instances, the backbone will have a width and a thickness. It will be understood that the width dimension (b) will be that dimension which extends perpendicularly to the plane of curvature and the thickness (h) will be the dimension which lies in the plane of curvature.

It can be shown, with a backbone which has a rectangular cross-section at all positions along its length, that $$I_{yy}(x) = \frac{b^3(x) * h(x)}{12}, \text{and} \quad (3)$$

$$I_{zz}(x) = \frac{(b(x) * h^3(x)}{12} \quad (4)$$

Thus, with a rectangular cross-section, $$Z_{TR} = \int_o^l \sin \left[ \int_o^x \frac{h^2(x)}{R(x) b^2(x)} dx \right] dx \quad (5)$$

BRIEF DESCRIPTION OF THE DRAWINGS

The invention is now described, by way of an example, with reference to the accompanying drawings, in which.

DETAILED DESCRIPTION OF THE DRAWINGS

Figure 1:
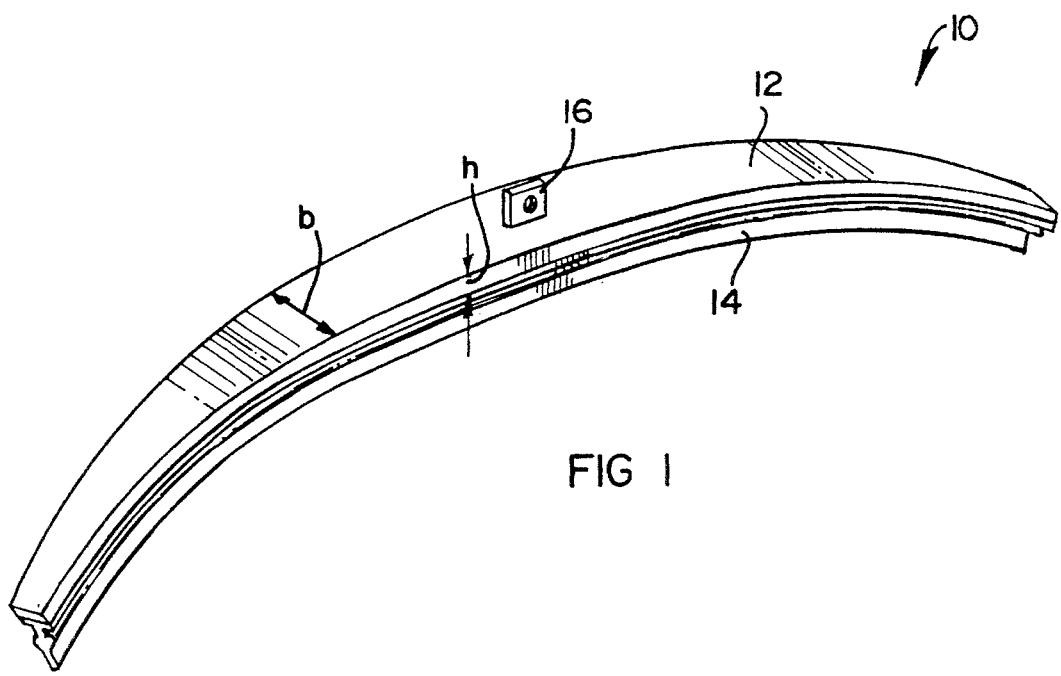
FIG. 1 is a schematic perspective view from above of a windscreen wiper in accordance with the invention.

A symmetrical windscreen wiper in accordance with the invention is referred to generally by reference numeral 10. It includes a spring backbone 12 and a rubber wiper blade 14. The backbone 12 has a centrally located connector 16 for releasably connecting the wiper 10 to a spring loaded wiper arm (not shown). The connector 16 could be of any suitable type. The backbone 12 has suitable attachment formations (also not shown) whereby the blade 14 is securely attached to the backbone 12, or the blade 14 is glued to the backbone 12.

Figure 4:
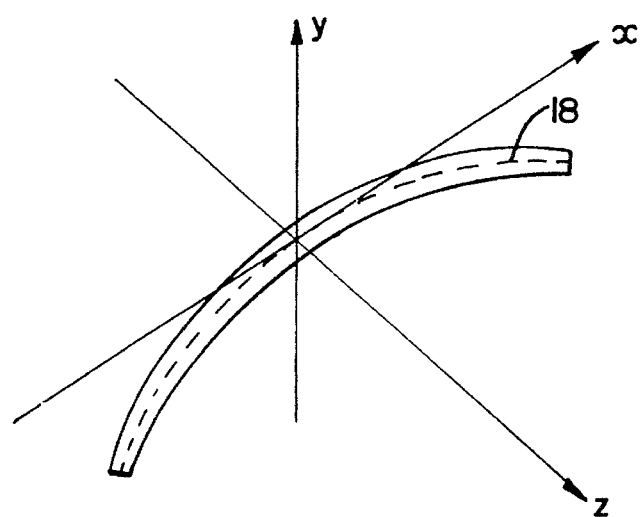
FIG. 4 shows schematically the axial convention utilised in this specification.

The spring backbone 12 is preferably made from spring steel and tapers both in width and thickness from its centre towards its free ends or tips. The backbone is pre-curved longitudinally with a predetermined radius of curvature (R) at every point in its length. The backbone 12 defines a plane, which is defined by the sheet of paper in FIG. 2. As indicated in FIG. 4, a median line 18 of the backbone 12 lies in the x–y plane with the x axis extending tangentially at the centre of the backbone 12. The z-axis defines a transverse axis perpendicular to the plane in which the free-form curved profile of the backbone 12 lies.

The backbone 12 has a rectangular cross-sectional profile at all points along its length. Thus, the backbone 12 has a width b and a thickness h as indicated in FIG. 1. It will be appreciated that the width b is the dimension parallel to the z-axis and the thickness h is the dimension perpendicular to the tangent at each point.

Figure 2:
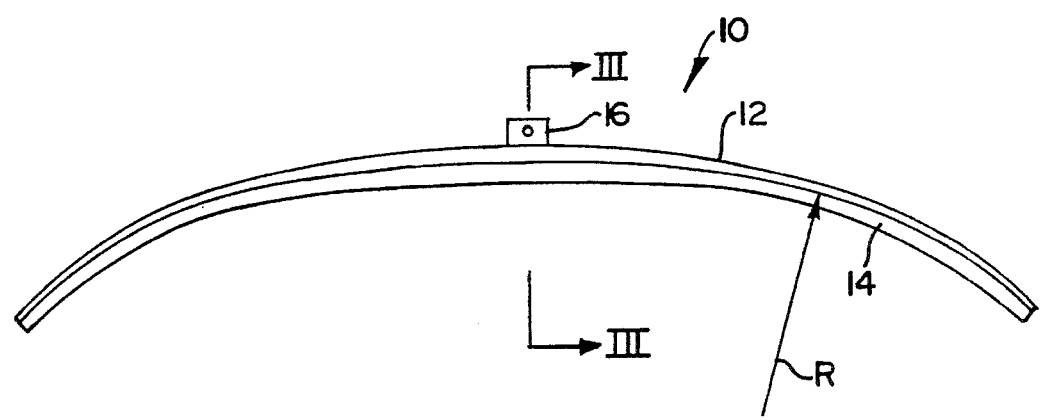
FIG. 2 is a side elevation of the windscreen wiper in an unloaded, free-form condition.
Figure 3:
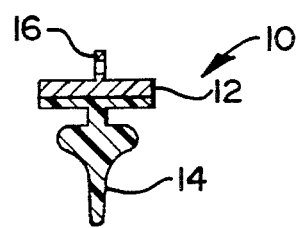
FIG. 3 is a schematic sectioned view of the wiper along lines III—III in FIG. 2.
Figure 5:
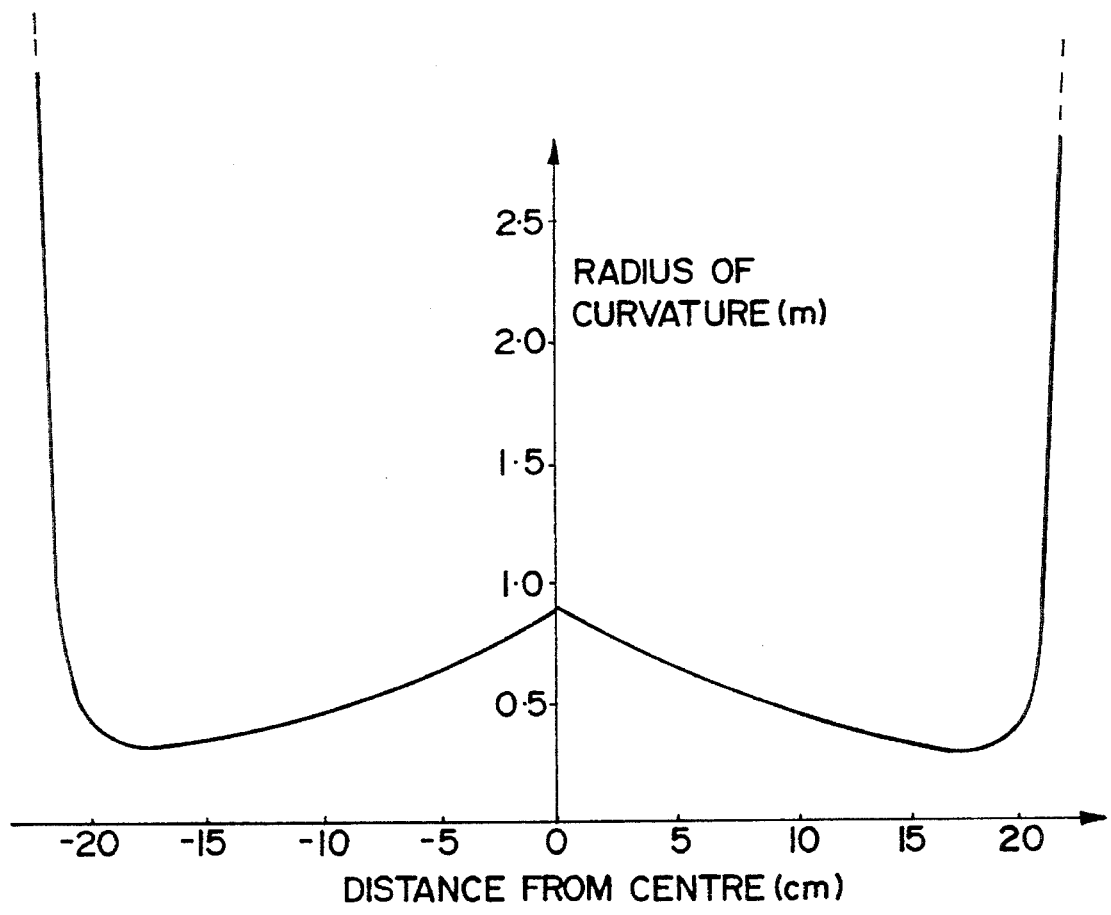
FIG. 5 shows graphically the variation in the radius of curvature of the backbone of the wiper in its free-form condition.

The free-form radius of curvature R of the backbone 12 is indicated in FIG. 2 and the variation thereof is shown in FIG. 5.

In the example shown, the backbone has a total length L=450 mm
a modulus of elasticity=$207 \times 10^9$ N/m$^2$
thickness at the centre of the backbone=1.29 mm
thickness at the tips=0.22 mm
width at the centre=11 mm, and
width at the tips=6 mm.

The backbone tapers uniformly in both thickness and width in a straight line manner from its centre to its tips.

If the wiper is securely clamped at its connector 16 and a lateral force applied at either tip, parallel to the Z-axis, of 1N, the lateral displacement of the tip in the Z direction is 0.28 mm allowing for experimental errors.

The value of $Z_E$ (as determined in the equation 1 above) is 2.03 mm

Similarly, if the value of $Z_{TR}$ (from equation 5 above) is computed it will be found to be 0.28 mm.

I claim:

1. A windscreen wiper which includes
an elongate backbone which is curved in a plane, is of a resiliently flexible material and which has a connecting formation at a portion intermediate its length for connection to a displacing and force applying member; and
a wiper blade attached to the backbone;
the backbone having first and second longitudinal ends and a mounting surface defined along the length thereof from said first longitudinal end to said second longitudinal end, said backbone being secured to said wiper blade, said curved backbone being substantially coextensive with said wiper blade, said backbone having a transverse cross-sectional profile defining a thickness and a width thereof, the thickness of said backbone being greatest at said intermediate portion and gradually decreasing along at least a first portion of said backbone, which is defined between said connecting formation and said first longitudinal end,
the backbone having a free-form curved profile in a plane, whereby the backbone defines an x–y plane, a z-axis extending perpendicularly from the x–y plane;
the backbone having a suitably varying cross-sectional profile along its length and a suitable free-form curvature, such that a double integral $Z_T$ is less than 1.0 mm, where $$z_T = \int_0^l \sin\left[\int_0^x \frac{I_{zz}(x)}{R(x) I_{yy}(x)} dx\right] dx$$

where l is a cantilever length of the backbone from the connecting formation to the first longitudinal end of the backbone and $I_{zz}(x)$ is the moment of inertia about the z-axis at a position x along the backbone from the connecting formation, $R(x)$ is the radius of curvature of the backbone at position x expressed in metres, and $I_{yy}(x)$ is the moment of inertia about the y-axis at position x.

2. The windscreen wiper as claimed in claim 1, in which $Z_T$ is less than 0.5 mm.

3. The windscreen wiper as claimed in claim 1, in which the backbone is of metal.

4. The windscreen wiper as claimed in claim 1, in which the backbone is in the form of a single homogenous strip.

5. The windscreen wiper as claimed in claim 1, in which the connecting formation is located at about a longitudinal center of said backbone.

6. The windscreen wiper as claimed in claim 1, in which the backbone is symmetrical with respect to the connecting formation.

7. The windscreen wiper as claimed in claim 1, in which the distance from the connecting formation to each longitudinal end is at least 200 mm.

8. The windscreen wiper as claimed in claim 1, in which the transverse cross-sectional profile of the backbone has the same shape along the length of the backbone and varies in size.

9. The windscreen wiper as claimed in claim 8 which has a rectangular cross-section with the backbone having a width dimension b(x), a thickness dimension h(x) and a radius of curvature R(x) at each point x along its length and in which $$Z_T = Z_{TR} = \int_0^l \sin\left[\int_0^x \frac{h^2(x)}{R(x) b^2(x)} dx\right] dx.$$

10. The windscreen wiper as claimed in claim 1,
wherein said wiper blade has first and second longitudinal ends, a wiper edge defined along the length thereof from said first longitudinal end to said second longitudinal end, and a substantially flat mounting face defined along the length thereof from the first longitudinal end to the second longitudinal end and opposed to said wiper edge; and
said mounting surface of said backbone is substantially flat, said backbone being secured to said wiper blade so that said mounting surface is in opposed facing relation to and in substantially continuous contact with said mounting face of said wiper blade.

* * * * *